US008242815B2

(12) United States Patent
Scobie et al.

(10) Patent No.: US 8,242,815 B2
(45) Date of Patent: Aug. 14, 2012

(54) MICROCONTROLLER UNIT AND METHOD THEREFOR

(75) Inventors: James Andrew Collier Scobie, Glasgow (GB); Derek Beattie, Glasgow (GB); Carl Culshaw, Glasgow (GB); Alan Devine, Paisley (GB); James Feddeler, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 61 days.

(21) Appl. No.: 12/596,253

(22) PCT Filed: Apr. 26, 2007

(86) PCT No.: PCT/IB2007/051562
§ 371 (c)(1),
(2), (4) Date: Oct. 16, 2009

(87) PCT Pub. No.: WO2008/132558
PCT Pub. Date: Nov. 6, 2008

(65) Prior Publication Data
US 2011/0012650 A1 Jan. 20, 2011

(51) Int. Cl.
H03L 7/00 (2006.01)
(52) U.S. Cl. ........................................ 327/143
(58) Field of Classification Search .................. 327/142, 327/143, 196
See application file for complete search history.

(56) References Cited

U.S. PATENT DOCUMENTS

| 5,237,699 A | 8/1993 | Little et al. |
| 5,619,156 A | 4/1997 | Jandu |
| 5,935,259 A | 8/1999 | Anderson |
| 5,968,178 A | 10/1999 | William et al. |
| 6,144,569 A | 11/2000 | Rodriguez et al. |
| 7,293,148 B2 * | 11/2007 | Schneider et al. ............ 711/164 |
| 7,567,098 B2 * | 7/2009 | Frew et al. ..................... 327/143 |
| 2004/0057324 A1 | 3/2004 | Abe et al. |
| 2007/0170960 A1 * | 7/2007 | Sakai et al. .................... 327/142 |

FOREIGN PATENT DOCUMENTS

| EP | 0565914 A | 10/1993 |
| EP | 0701194 A1 | 3/1996 |
| EP | 0834796 A | 4/1998 |
| EP | 1087404 A3 | 3/2004 |

OTHER PUBLICATIONS

International Search Report and Written Opinion correlating to PCT/IB2007/051562 dated Jan. 15, 2008.

* cited by examiner

Primary Examiner — Lincoln Donovan
Assistant Examiner — Daniel Rojas

(57) ABSTRACT

A microcontroller unit comprises a reset controller operably coupled to a plurality of logic elements of the microcontroller unit. Low voltage detection logic is operably coupled to the reset controller and arranged to provide a plurality of low voltage interrupt signals to a number of respective logic elements of the microcontroller unit via the reset controller. A method of operating a microcontroller unit is also described.

18 Claims, 5 Drawing Sheets

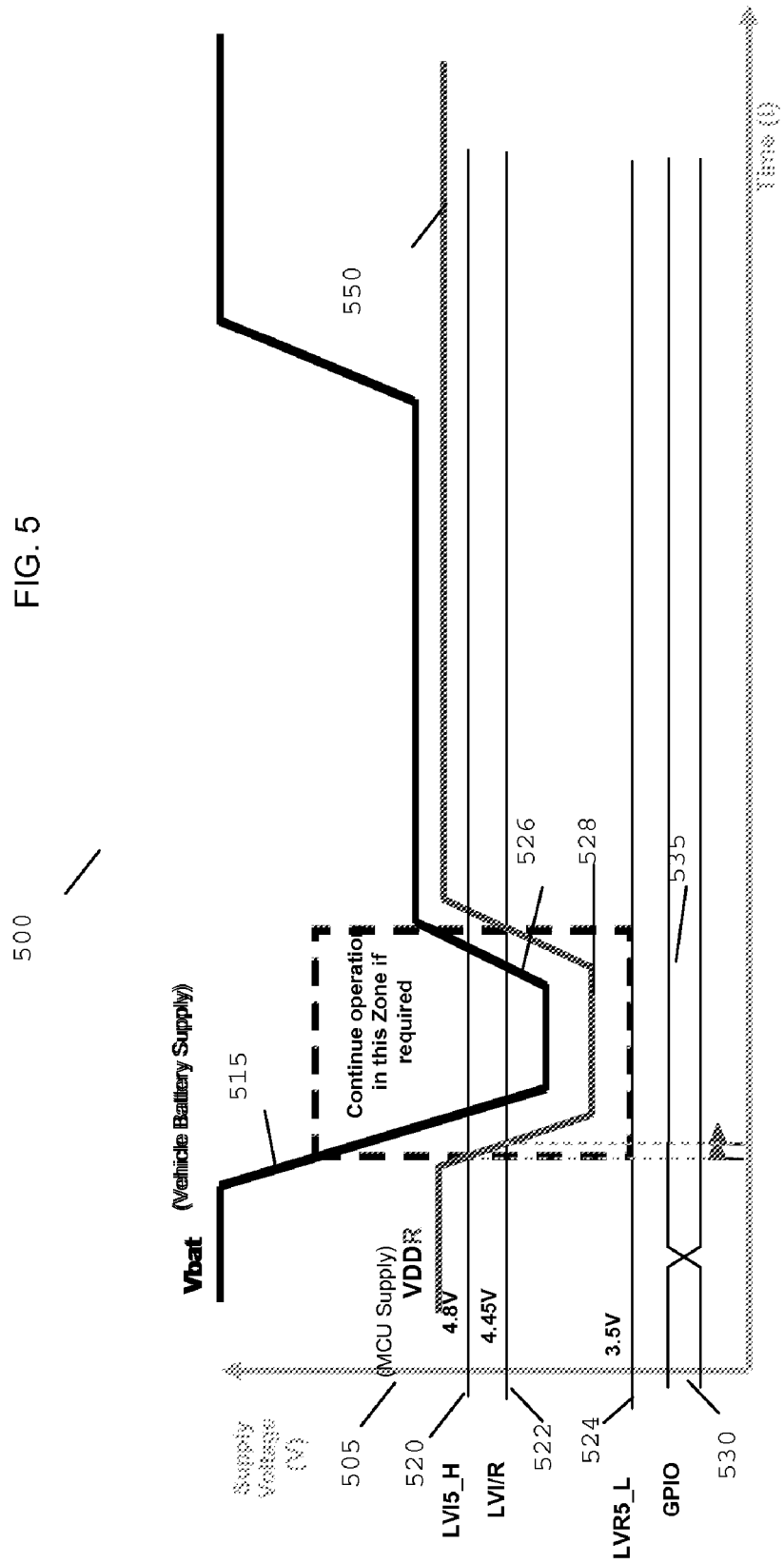

MICROCONTROLLER UNIT AND METHOD THEREFOR

FIELD OF THE INVENTION

The field of the invention relates to a microcontroller unit (MCU). The invention is applicable to, but not limited to, maintenance of operational states of the microcontroller unit during out of specification operational conditions.

BACKGROUND OF THE INVENTION

In the field of microcontroller units (MCUs) employing clocked circuits/signals it is known that the synchronous logic circuits introduce limitations with respect to the voltage and temperature operating range dependent upon the clock frequency employed in the MCU. The term synchronous logic circuit generally encompasses any clocked logic circuit where logic signals are propagated through a circuit in response to a plurality of timing signals, such as trigger signals or a variety of clock signals. In low voltage or high temperature states, during for example MCU initialisation or controlled power down of the MCU, the MCU needs to be maintained in a fully functional state. When clocked (synchronous) logic is used for such functional operations, a specific range of voltage and temperature is specified, with no performance guarantees provided outside of this range. However, it is known that operating conditions of voltage and temperature regularly exist that fall outside of this normal operating range.

FIG. 1 illustrates a known graphical representation 100 of supply voltage (Vdd) 105 versus time 110 of an operation of such an MCU. Here, a battery supply voltage 115 is shown as drooping below a threshold, for example a vehicular battery supply drooping in response to a cold-crank operation of the vehicle's engine. The droop in battery supply voltage 115 causes a corresponding droop in the MCU supply voltage (VDDR) 140 regulated down from the battery supply voltage 115.

In a correctly constructed MCU system, when the MCU supply voltage (VDDR) 140 falls below the minimum MCU supply voltage limit (i.e. below a Low Voltage Reset (LVR) threshold 125 of the device), this will normally result in an assertion of a low voltage detection event in order to protect against the execution of the device when out of specification.

In this way, for example, the reset operation prevents an indeterminate operation of the MCU device. For example, the LVR threshold 125 may be set to, say, 4.45V in a nominal 5V MCU system. Unfortunately, this Reset event will cause the device registers to reset to their default conditions, default configuration e.g. pull-up/pull-down values to be set and loss of the values held on the MCU integrated circuit (IC) pins, including the general purpose input-output (GPIO) pin, and inputs with no driven level.

Further, many MCU applications require compliance with stringent safety standards, such as EN60730, which demand deterministic behaviour in all conditions. There is therefore a need for the MCU to exhibit deterministic behaviour at a wider range of operating conditions than generally specified, and particularly at a lower voltage than the point at which the MCU is fully operational. For example, MCUs need to support safety modes during start-up, power down and in response to unexpected external events.

It is known that some techniques exist to minimise risks of incorrect MCU operation at low operating voltages, such as providing a watchdog function or provide low voltage interrupt (LVI) functions. These functions provide some protection, but are known to also suffer the same limitations that the MCU suffers from. For example, if the design of the MCU is based on clock signals, then single point failures are still possible due to incorrect clock operation and the operation of the MCU is more or less the same for the watchdog as it is for the rest of the MCU.

One application of MCUs is in vehicular electronics. In this context, Electronic Control Units (ECUs) are provided with MCUs that control the vehicular electronic hardware. One problematic area in such a vehicular application is, for example, during a crank phase of engine ignition. Here, a reduction in the engine's power supply, due to a transferral of energy to components required to ignite the engine, may result in a drop in MCU voltage and thereby an activation of the LVR of the MCU. This will result in the MCU losing the ability to continue to drive the hardware components.

Thus, a good system design is required to protect the device from operation outside of the allowable specification. Within the defined specification operating ranges, the operation of the MCU device is normally protected with Low Voltage Reset (LVR) logic that will reset the device. A Reset is defined as a mechanism that returns the device to a known default condition, including halting the current processing operations and allowing a restart from a fixed known execution sequence. In contrast, an interrupt is defined as processing exception, which, if enabled, halts the current execution sequence and automatically starts a new processing sequence.

It is known that existing devices with a single input supply, e.g. nominal 5V or 3V-5V, are unable to support operation of the MCU in some vehicular applications, for example when the voltage drops to a sufficiently low voltage level, often referred to as a 'cold crank' level. In this context, the device is held in a Reset state allowing external hardware (generally a pull-up resistor) to determine a respective MCU pin value. For some MCU-based systems, it is known that the device's GPIO levels may droop as the supply voltage level droops. This drooping is as a result of the I/O voltage levels also reducing. Cold cranking of the engine at ignition is an example of when a voltage supply will temporarily be outside of the specified boundaries. However, this application only supports a default voltage supply level.

However, elements of the MCU application still need to be supported even under these extreme conditions, for example: the MCU still needs to support push-button ignition, the MCU must still support the control of the starter relay coil even though cranking the vehicle engine will droop the power supply below the normal LVR level. If LVR activates under such a condition, this will reset the device and consequently any pin values on the MCU currently used to control the relay may change. Thus, such a reset operation may well stop the ignition from taking place. Cold Crank represents an event where a known temporary excursion from the specification should still support continued operation of the device. Thus, in some instances, a low voltage interrupt/low voltage reset (LVIR) operation will generate an interrupt when the power supply drifts outside of the required specification to prevent any indeterminate operation of device.

EP701194A describes a mechanism to support holding a pin state of an MCU when the power supply falls below a defined operating device level. Further, EP1087404 describes a mechanism to support holding a pin state when the power supply falls below the defined operating device level. EP1087404 is specifically related to a supply level when EEPROM programming is to be performed, and guards against incorrect write operations if the input supply can not support a necessary load from an associated charge pump.

Thus, a need exists for an improved MCU and method of operation therefor.

SUMMARY OF THE INVENTION

In accordance with aspects of the invention, there is provided a microcontroller unit and method of operation therefor, as defined in the appended Claims.

Figure 1:
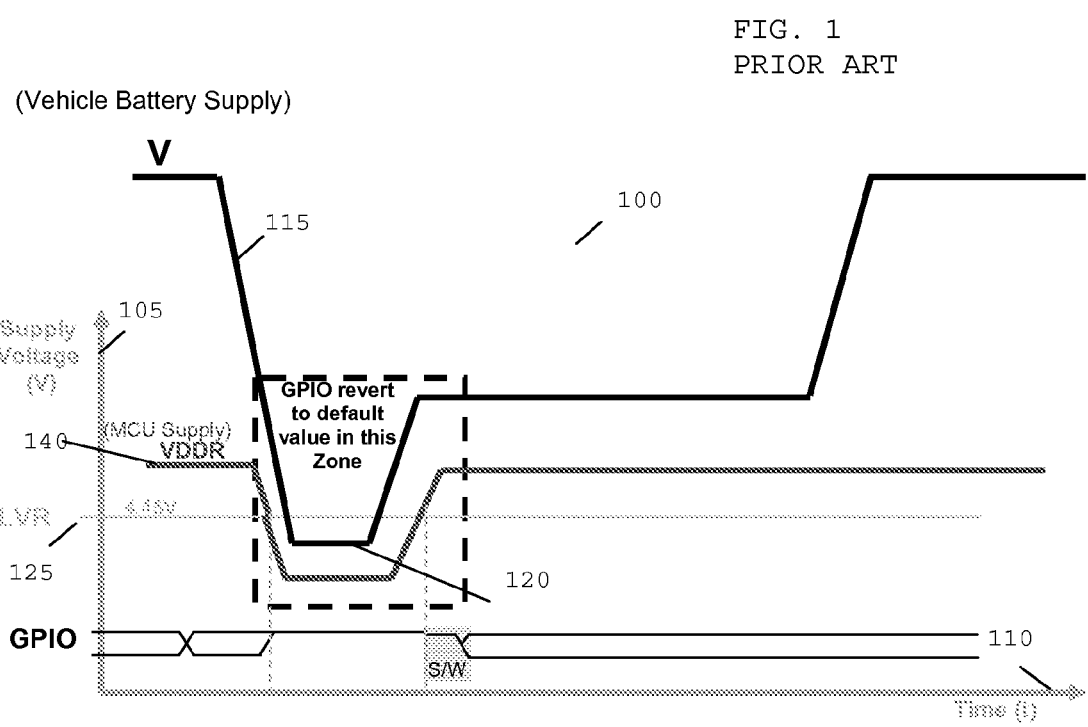
FIG. 1 illustrates a known graphical representation of Vdd versus time of an operation of the MCU.
Figure 2:
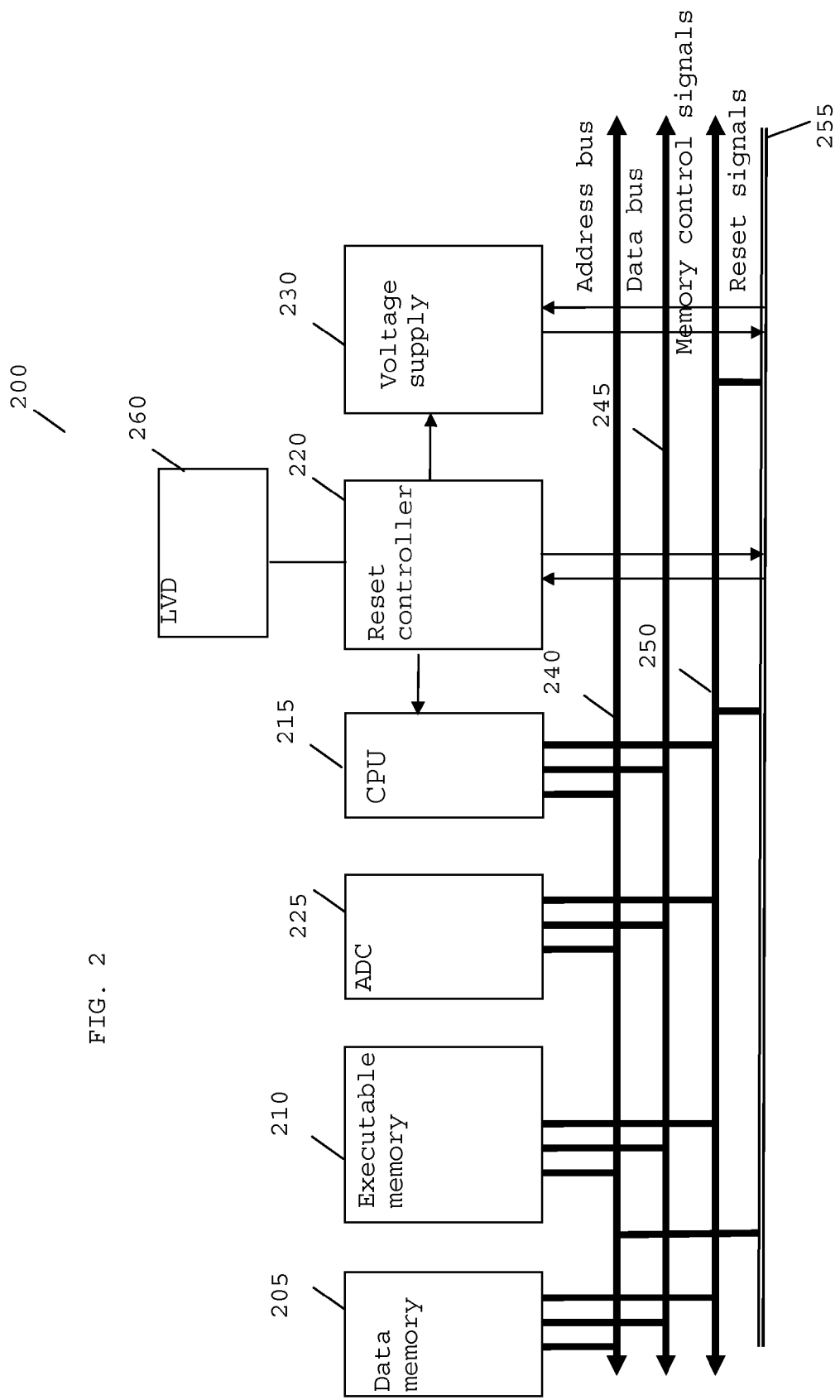

Exemplary embodiments of the invention will now be described, by way of example only, with reference to the accompanying drawings, in which:

FIG. 2 illustrates a microcontroller unit adapted in accordance with embodiments of the invention.

Figure 3:
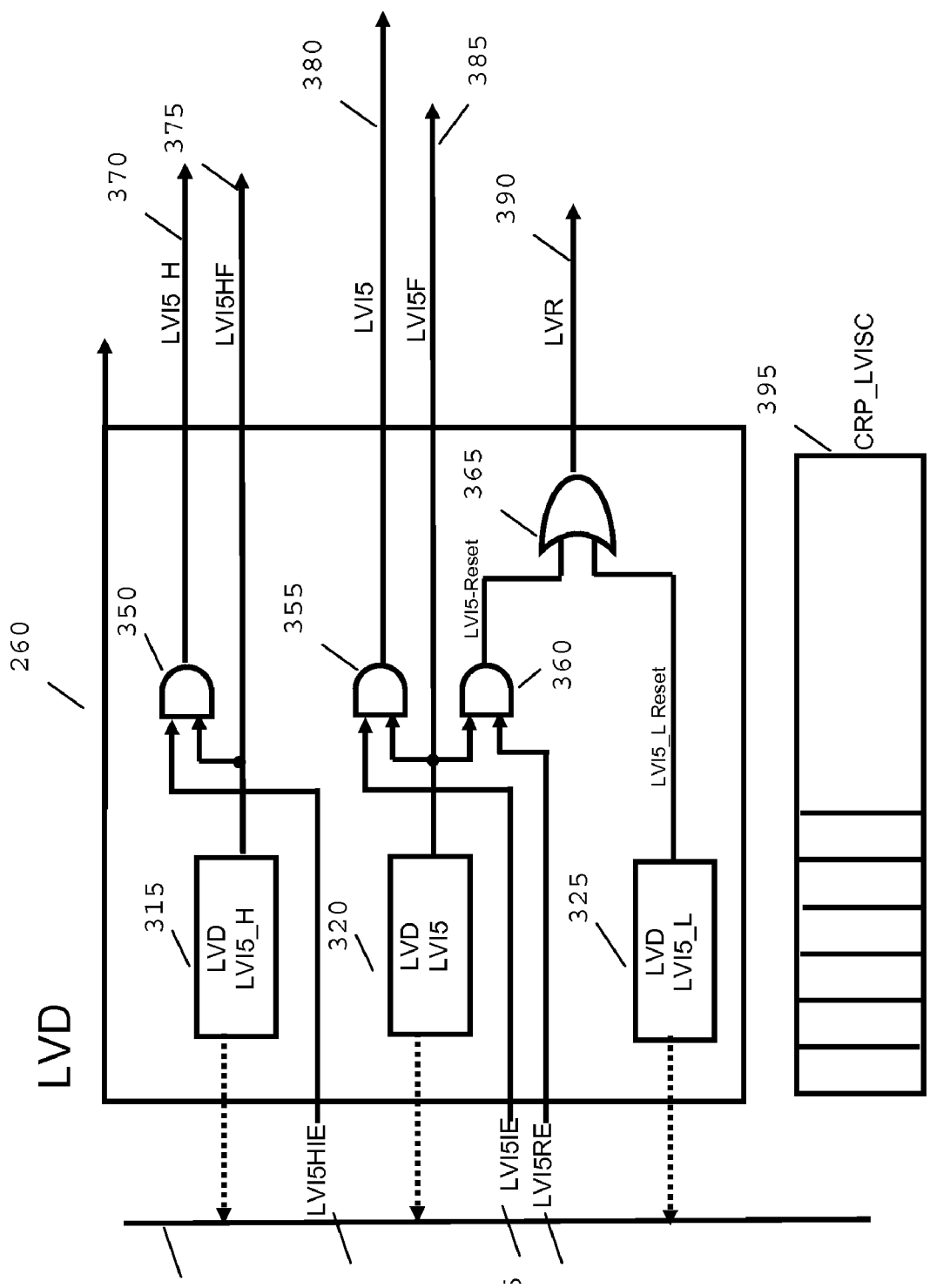

FIG. 3 illustrates a low-voltage detection arrangement in accordance with embodiments of the invention.

Figure 4:
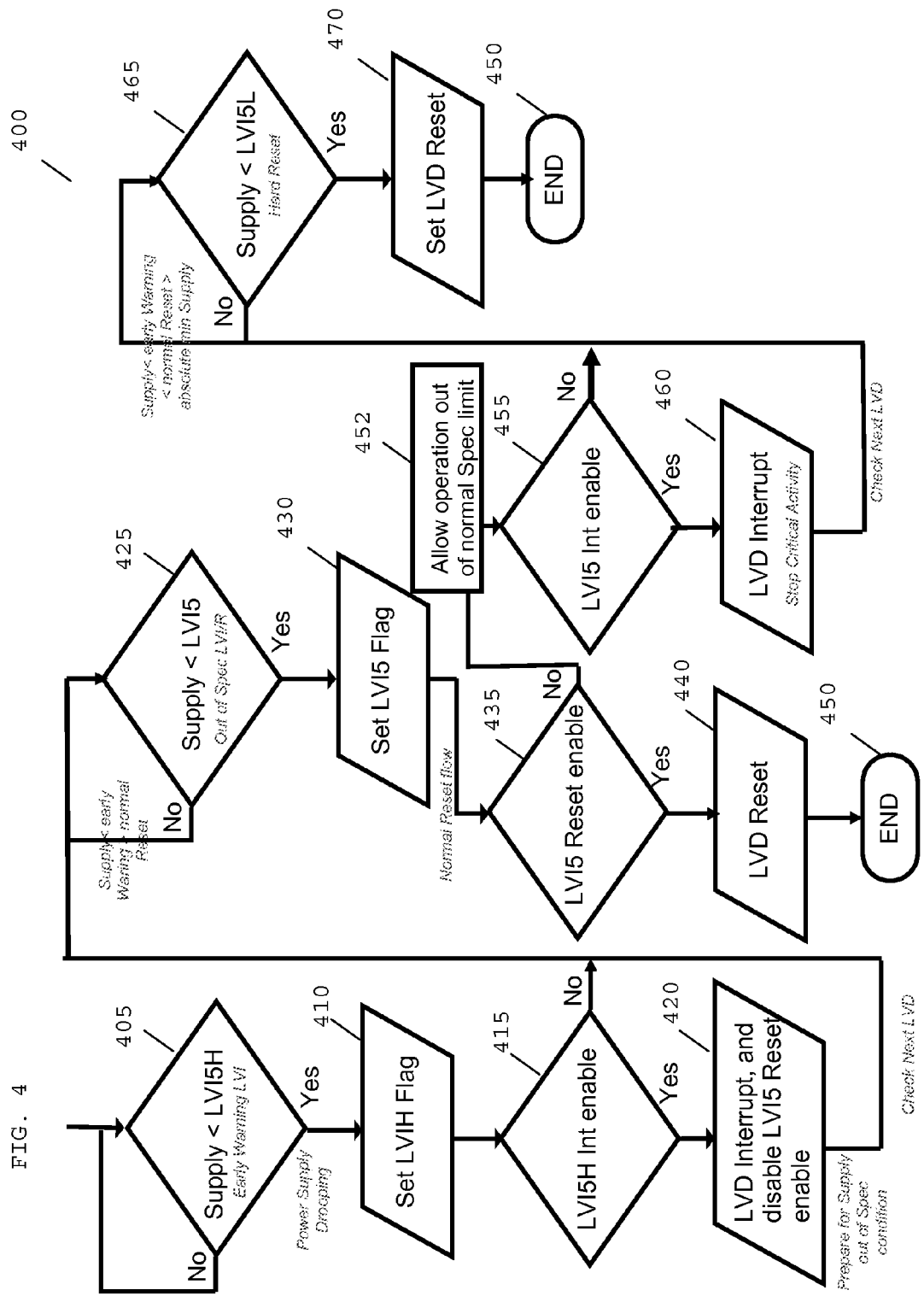

FIG. 4 illustrates a flowchart of a microcontroller unit in accordance with embodiments of the invention.

FIG. 5 illustrates an operation cycle of an MCU in accordance with embodiments of the invention.

DESCRIPTION OF EMBODIMENTS OF THE INVENTION

Before describing in detail embodiments that are in accordance with the invention, it should be observed that the various apparatus components described herein, and as shown in the accompanying drawings, have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Embodiments of the invention will be described in terms of a microcontroller unit (MCU). However, it will be appreciated by a skilled artisan that the inventive concept herein described may be embodied in any type of signal processing module or device. Therefore, hereinafter, the term MCU is meant to encompass any signal processing module or device.

Furthermore, it is envisaged that the inventive concept is not limited to use in safety critical applications. It is envisaged that the inventive concept herein described may equally be applied to low power applications and applications to survive regular excursions beyond the normal operating conditions of conventionally clocked logic. It is also envisaged that the inventive concept herein described may equally be applied to applications requiring changes in operating conditions, whilst maintaining gradual change of control to accommodate the change in environment or external MCU conditions.

In summary, in accordance with some embodiments of the invention, multiple programmable LVIs are used to separately reset independent sections of a microcontroller-based system, sometimes referred to as a System-on-Chip (SoC). Thus, in accordance with embodiments of the invention, using different LVI levels for, say, the microprocessor core, the flash, the analogue-to-digital converter (ADC) and the GPIOs, allows selective and controllable operation of the different sections of the SoC down to their respective minimum possible levels of operation. This is particularly advantageous in allowing a programmed state of GPIOs to be maintained, even when the voltage for the MCU core to operate has already reached a level that does not allow proper operation of the core any more. Advantageously, embodiments of the invention may reduce a complexity of the power supply on the printed circuit board (PCB) level for special applications that need to deal with power drooping during engine cranking. Advantageously, embodiments of the invention may provide a competitive advantage due to reduced system cost on the PCB level or preventing price penalties for failure to offer support for a particular application's requirements outside of a specified operating range.

Further, in providing different and independently controllable low voltage circuit assertion levels, it is possible to support continued partial operation of the device even when the supply is beyond the specified normal operating limits. This advantageously prevents the device from being reset during brown-out events and thereby retains the GPIO state while maintaining protection of the device against unsustainable voltage drops. Advantageously, higher levels of protection may also be supported through appropriate configurability of the low voltage detection circuits, if needed.

Referring now to FIG. 2, a microcontroller unit 200 is illustrated that has been adapted to support embodiments of the invention. The MCU 200 comprises, for example, a data memory 205, executable memory 210, a central processing unit (CPU) 215, a reset controller 220, an analogue-to-digital converter 225 and a voltage supply 230. The data memory 205, executable memory 210, central processing unit (CPU) 215 and reset controller 220 are each designed using conventional clocked logic circuits and controlled using conventional controller functionality. Furthermore, the data memory 205, executable memory 210, central processing unit (CPU) 215, analogue-to-digital converter 225 and reset controller 220 are each coupled to address bus 240, data bus 245 and memory bus 250. The reset controller 220 is also operably coupled to a reset bus 255, for receiving or transmitting reset signals to one or more functional logic circuits.

In accordance with embodiments of the invention, a low voltage detection arrangement 260 is provided, as described later with respect to FIG. 3, FIG. 4 and FIG. 5.

Referring now to FIG. 3, a more detailed functional block diagram of one embodiment of a low voltage detection (LVD) arrangement 260 is illustrated. The LVD arrangement 260 is provided with a nominal 5V supply 305 and comprises a number of logic elements. In particular, in accordance with embodiments of the invention, the LVD arrangement comprises a plurality of logic elements to provide different reset levels based on different input signals. For example, in the embodiment shown, the LVD arrangement 260 comprises three reset/threshold levels: logic 315 to support a high reset level (LVI5_H), logic 320 to support a median reset level (LVI5) and logic 325 to support a low reset level (LVI5_L).

Logic elements 315, 320 and 325 represent elements that compare the supply voltage 305 to preset threshold levels, and cause their output signals LVI5HF, LVI5F, and LVI5_L_Reset (respectively) to assert when the supply voltage goes below the threshold. The implementation of these elements may vary based on the technology or product, but several implementations are well known in the art. One such implementation is to use a feedback resistor array to reduce a supply voltage to a proportion of its actual value, and to use a voltage comparator to compare this voltage to a known reference voltage; the output of the comparator to assert when the output of the resistor divider is less than the known reference voltage.

Although embodiments of the invention are described with reference to using three reset/threshold levels, it is envisaged that in other embodiments of the invention, other numbers of reset/threshold levels may be used. For example, in some instances, it is envisaged that only two reset/threshold levels may be used, for example where a first reset/threshold level is used to signify out-of-spec operation and a second reset/threshold level is used to initiate a hard reset. Alternatively, in other embodiments of the invention, it is envisaged that numerous reset/threshold levels may be used, for example where each logic or functional element operably coupled to the reset controller and CPU comprises its own operational threshold level.

The operation of the LVD arrangement 260 of the microcontroller unit in accordance with embodiments of the invention commences with a determination of whether the supply voltage is less than a first low voltage interrupt level ('supply<LVI5H') is made. In this embodiment, the first low voltage interrupt level 315 may be used as an early warning LVI. The early warning LVI may provide a warning to a user that the MCU may be about to traverse out of its specified limits. Thus, the warning may be used to prepare for out of specification operation (for example, initiating an ignore/stop operation for the analogue-to-digital converter (ADC), stop Flash programming or stop memory erase operations, etc). The output (LVI5HF) 375 of the first low voltage interrupt detector 315 is input to a first logical 'AND' gate 350, where it is 'AND'ed with a first low-voltage reset signal (LVI5HIE) 330.

If the first low-voltage reset signal (LVI5HIE) 330 is enabled, then the MCU system will allow the operation of one or more specific logic elements, for example data memory 205, executable memory 210, ADC 225 and/or CPU 215 from FIG. 2, outside of the normal specification limit for that logic element.

A second low-voltage reset signal (LVI5) 380 is generated from an output of a second logical 'AND' function 355, that performs an 'AND' operation on an output signal (LVI5F) 385 of the median (second) low voltage interrupt logic level (320) and a second received control signal (LVI5IE) 335. In this embodiment, the second low voltage reset signal (LVI5) 380 may be used as an 'out of specification' LVI/R warning and be asserted just below the allowable normal operating specification limit. Thus, the second low voltage reset signal (LVI5) 380 may be configured to generate a Reset signal, as it will occur at the standard LVR level just beyond the Spec limit. However, in some embodiments it is envisaged that the second low voltage reset signal (LVI5) 380 may be configured to notify the user that they are now operating outside of the specified limit, if it has been decided to continue to operate at such voltages. Alternatively, this interrupt may be used to generate one or more further interrupt signal(s), or to be ignored.

Further, in this embodiment, a third low voltage interrupt level 325 may be used as a hard reset signal. The output of the third low voltage interrupt level 325 is input to a logical 'OR' gate 365, where it is 'OR'ed with a fourth low-voltage reset signal. The fourth low-voltage reset signal is generated from an output of a second logical 'AND' function 360, that performs an 'AND' operation on an output signal (LVI5F) 385 of the median (second) low voltage interrupt logic detector 320 and a third received control signal (LVI5RE) 340. The output from the 'OR' gate 365 forms a low-voltage hard reset (LVR) output signal 390.

The LVI levels set by the respective LVD logic elements 315, 320, 325 are critical components of the MCU device operation, and hence their operation is arranged to be both predictable and prohibit malfunctions from changing their behaviour. Such malfunctions to be avoided may include code runaway or poor code design.

It is envisaged in one embodiment of the invention that the respective interrupt levels for respective logic components within the MCU system may be stored in a look-up table 395. In this manner, the respective interrupt levels may be independently accessible and modifiable.

In accordance with embodiments of the invention, there are several implementation approaches envisaged, each with different characteristics that can typically be used to achieve the multiple LVI operation. For example, in accordance with embodiments of the invention, the LVD logic elements 315, 320, 325 may be either fixed or programmable. When the operation of the LVD logic elements 315, 320, 325 is fixed each level may be set to automatically trigger a respective Interrupt or RESET operation. Thus, in this embodiment, all bits may be fixed, with no or little option to change the levels. Advantageously, this embodiment offers high resilience, but at the expense of minimal flexibility.

Alternatively, in a fully programmable implementation, each level of the LVD logic elements 315, 320, 325 may be set to selectively trigger a reset or interrupt. Advantageously, this embodiment offers high flexibility, but may be prone to corruption due to inadvertent modification of the code or code runaway. The high selectivity of reset, interrupt, or logic levels may lead to an increased possibility of code or other mechanisms causing a mis-configuration. If the configurations are kept to a minimum, so are the chances of disruption.

In an enhanced embodiment of the fully programmable implementation, it is envisaged that the fully programmable implementation may be used with register locking, where control registers may only be accessed once. Thus, subsequent register accesses will have no effect. Advantageously, this embodiment readily supports techniques including 'write-once' or alternatively 'write-until-locked' operations.

In a yet further alternative embodiment of the invention, a partially programmable implementation, with register locking, is envisaged. Here, again, only certain control registers may be accessed once, where other registers are fixed. Thus, only certain interrupt levels may be selected to trigger resets or interrupts. Other levels may be configured as non-changeable, for example for fail-safe operation. Again, subsequent register accesses will have no effect. Advantageously, this embodiment also readily supports techniques including 'write-once' or alternatively 'write-until-locked' operations.

In one embodiment of the invention, a mechanism to protect the configuration of the detection hardware may be implemented in order to guard against inadvertent modification of the above protection circuits. In this embodiment, as the input power supply droops, the GPIO level will also droop eventually resulting in exceeding a specified low input voltage (VIL), high input voltage (VIH), low output voltage (VOL) and high output voltage (VOH) switching levels. Before this happens, it is envisaged that the threshold levels will be set to sufficiently high levels to ensure that the minimum Low Voltage Reset (LVR) will not be reached and thereby prevent incorrect recognition of voltage levels.

Referring now to FIG. 4, a flowchart 400 illustrates an operation of a microcontroller unit in accordance with embodiments of the invention. The flowchart 400 commences with a determination as to whether the supply voltage is less than a first low voltage interrupt level ('supply<LVI5H'). In this embodiment, the first low voltage interrupt level may be used as an early warning LVI, as shown in step 405. If it is determined that the supply voltage is not less than the first low voltage interrupt level in step 405, the determination loops as shown. However, if the determination indicates that the supply voltage is less than the first low voltage interrupt level in step 405, then the method sets an early warning (LVIH) flag, as shown in step 410.

A determination is then made as to whether a first low voltage interrupt level (LVI5H) is enabled, as shown in step 415. If the first low voltage interrupt level (LVI5H) is enabled, as shown in step 415, then a first low voltage detection (LVD) interrupt is set to prepare the MCU system for operation with a supply voltage that has traversed outside of its specified conditions, as shown in step 420. Thereafter, or following a determination that the first low voltage interrupt level (LVI5H) is not enabled in step 415, a determination of whether the supply voltage is less than a second low voltage interrupt level ('supply<LVI5') is made. In this embodiment, the second low voltage interrupt level may be used as an 'out of specification' LVI/R warning, as shown in step 425. If it is determined that the supply voltage is not less than the second low voltage interrupt level in step 425, the determination loops as shown. In this case the supply voltage may be understood as being less than the early warning level, but greater than the normal reset level. However, if the determination indicates that the supply voltage is less than the second low voltage interrupt level in step 425, then the method sets an 'out-of-spec' (LVI5) flag, as shown in step 430.

A determination is then made as to whether a low voltage reset has been enabled, in step 435. If the low voltage reset has been enabled, in step 435, then a LVD reset is set, as shown in step 440. The method will then end in step 450, as shown.

If the low voltage reset has not been enabled, in step 435, then the MCU system will allow the operation of one or more specific logic elements outside of the normal specification limit, as shown in step 452. A determination is then made as to whether a second interrupt (LVI5) is enabled, as shown in step 455.

If the second low voltage interrupt (LVI5) is enabled, in step 455, then a second LVD interrupt is set to stop one or more activities of the MCU system, as shown in step 460. Thereafter, or following a determination that the second low voltage interrupt level (LVI5) is not enabled in step 455, a determination of whether the supply voltage is less than a third low voltage interrupt level ('supply<LVI5L') is made. In this embodiment, the third low voltage interrupt level may be used as a 'hard reset', as shown in step 465. If it is determined that the supply voltage is not less than the third low voltage interrupt level in step 465, the determination loops as shown. In this case, the supply voltage may be understood as being lower than the early warning (first LVI) level and lower than the normal reset level, but greater than the absolute minimum supply voltage level. However, if the determination indicates that the supply voltage is less than the third low voltage interrupt level in step 465, then the method performs an LVD Reset operation, as shown in step 470, and ends in step 450.

FIG. 5 illustrates a graphical representation 500 of supply voltage (Vdd) 505 versus time 510 of an operational cycle of an MCU system in accordance with embodiments of the invention. Here, a vehicle battery supply voltage 515 is shown as drooping to a low level 526, for example in response to a cold-crank operation of the vehicle's engine. The drooping of the vehicle battery supply voltage 515 causes a consequent drooping to a low level 528 of the MCU supply voltage 550. As shown, the MCU supply droops below a first (early warning) threshold (LVI5_H) 520, and a second (median) threshold (LVI/R) 522. However, in accordance with the aforementioned embodiments, the MCU drooping level fails to reach a low threshold level (LVR5_L) 524 and therefore, in response thereto, the MCU supply voltage 550 is maintained within an operational region, for a number of associated logic elements of the MCU system. For example, as shown, the threshold levels may be set as:

$LVI5\_H520=4.8V$;

$LVI/R522=4.45V$; and $LVR5\_L524=3.5V$.

Thus, in accordance with embodiments of the invention, when the battery supply voltage 515 falls below the operating voltage limit, the consequent drop in MCU supply voltage no longer automatically results in an assertion of a Low Voltage Reset (LVR) signal of the device in order to protect against the execution of the device when out of specification, for example to prevent an indeterminate operation of the MCU device. In contrast, within the region highlighted, a selection of logic elements may be maintained as operational and not liable to be independently reset. For clarification, those elements that are unable to operate at the current voltage level will be disabled once the particular voltage usage threshold has been crossed. Hence, many elements will be unable to be used, but certain elements will remain functional. It is only these remaining elements that may continue to be used and driven up to the absolute lowest level.

A skilled artisan will appreciate that the aforementioned embodiments may provide one or more of the following advantages over known processor-based systems:

(i) The provision of multiple and different low voltage circuit assertion levels makes it possible to support continued partial operation of the device, even when the supply voltage is beyond the specified normal operating limits. This prevents the device from being Reset during Brown-out events.

(ii) A programmed state of GPIOs may be maintained even when a supply voltage applied to an MCU core has reached a sufficiently low level that a proper operation of the core is no longer guaranteed.

(iii) The MCU in accordance with embodiments of the invention may reduce a complexity of the power supply routing on the printed circuit board (PCB), particularly for special applications that need to deal with power drooping during engine cranking, through the removal for the need of power supervision circuitry.

(iv) The MCU in accordance with embodiments of the invention may protect against excessively low supply levels, by using multiple internal voltage levels that are all generated on-chip from a single input supply level.

(v) All internal supplies are protected in operational modes against low voltage by the assertion of a Reset. For the main externally supplied voltage, some of these protection circuits may be configurable.

(vi) Higher levels of protection may be supported through the individual configurability of the low voltage detection circuits, if needed.

(vii) A high level interrupt offers an early warning before the supply goes out of the operating limits and allows error prone processing to be halted to before the generation of any faults. This may include functions such as Flash write operations and Analogue to Digital Conversions (ADC).

(viii) Embodiments of the invention allow any value to be driven on a pin through a brown-out event and thereby allowing a continued operation of externally controlled hardware.

In particular, it is envisaged that the aforementioned inventive concept can be applied by a semiconductor manufacturer to any microcontroller unit, for example those of the Freescale™ MCU family. It is further envisaged that, for example, a semiconductor manufacturer may employ the inventive concept in a design of a stand-alone device, or application-specific integrated circuit (ASIC) and/or any other sub-system element.

It will be appreciated that any suitable distribution of functionality between different functional units or MCU logic elements, may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the invention has been described in connection with some embodiments, it is not intended to be limited to the specific form set forth herein. Rather, the scope of the invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved microcontroller unit and method of operation therefor have been described, wherein the aforementioned disadvantages with prior art arrangements have been substantially alleviated.

The invention claimed is:

1. A microcontroller unit comprising:
a reset controller operably coupled to a plurality of logic elements of the microcontroller unit,
a low voltage detection logic is operably coupled to the reset controller and arranged to provide a plurality of low voltage interrupt signals to a number of respective logic elements of the microcontroller unit via the reset controller, wherein the low voltage detection logic is operably coupled to at least one register employing register locking, wherein upon applying a low voltage interrupt signal of the plurality of low voltage interrupt signals to the register the register may only be accessed once prior to reset, and wherein the plurality of low voltage interrupt signals comprises:
a warning that a voltage supply to the microcontroller unit is to traverse out of specification;
a notification that a voltage supply to the microcontroller unit has traversed out of specification; and
a reset initiating signal.

2. The microcontroller unit of claim 1 wherein the low voltage detection logic is arranged to provide each of the plurality of low voltage interrupt signals independent of each other to a plurality of the number of respective logic elements of the microcontroller unit via the reset controller.

3. The microcontroller unit of claim 1 wherein the low voltage detection logic is arranged to programmably provide the plurality of low voltage interrupt signals to a plurality of the number of respective logic elements of the microcontroller unit via the reset controller.

4. The microcontroller unit of claim 1 wherein the low voltage detection logic provides at least one of the plurality of low voltage interrupt signals to general purpose input-output ports of the microcontroller unit via reset controller.

5. The microcontroller unit of claim 1 wherein the plurality of logic elements of the microcontroller unit comprise one or more of the following: a data memory element, an executable memory, a central processing unit, the reset controller, and an analogue-to-digital converter.

6. The microcontroller unit of claim 1 wherein the low voltage detection logic provides one of the plurality of low voltage interrupt signals to independently enable operation of one or more of the plurality of logic elements of the microcontroller unit based on a supply voltage level provided to the microcontroller unit via the reset controller.

7. The microcontroller unit of claim 1 wherein the microcontroller unit comprises a part of a system-on-chip integrated circuit.

8. An integrated circuit comprising the microcontroller unit of claim 1.

9. The microcontroller unit of claim 1 wherein the notification is configured to notify a user that the microcontroller is operating outside of a specified limit, and wherein the reset initiating signal is configured to cause a hard reset of at least one of the plurality of logic elements of the microcontroller unit.

10. A method of operating a microcontroller unit comprising a reset controller operably coupled to a plurality of logic elements of the microcontroller unit, the method comprising:
providing a plurality of low voltage interrupt signals to a number of respective logic elements of the microcontroller unit via the reset controller; and
providing a low voltage interrupt signal of the plurality of low voltage interrupt signals to at least one register of the microcontroller unit employing register locking such that the register may subsequently only be accessed once prior to reset, wherein the plurality of low voltage interrupt signals comprises:
a warning that a voltage supply to the microcontroller unit is to traverse out of specification when the voltage supply is below a first threshold voltage and above a second threshold voltage;
a notification that a voltage supply to the microcontroller unit has traversed out of specification when the voltage supply is below the second threshold voltage and above a third threshold voltage; and
a reset initiating signal when the voltage supply is below the third threshold voltage.

11. The method of operating the microcontroller unit of claim 10, comprising:
providing each of the plurality of low voltage interrupt signals independent of each other to a plurality of the number of respective logic elements of the microcontroller unit via the reset controller.

12. The method of operating the microcontroller unit of claim 10 comprising programmably providing the plurality of low voltage interrupt signals to a plurality of the number of respective logic elements of the microcontroller unit via the reset controller.

13. The method of operating the microcontroller unit of claim 10 comprising:
providing at least one of the plurality of low voltage interrupt signals to general purpose input-output ports of the microcontroller unit via the reset controller.

14. The method of operating the microcontroller unit of claim 10 comprising:
providing one of the plurality of low voltage interrupt signals to independently enable operation of one or more of the logic elements of the microcontroller unit based on a supply voltage level provided to the microcontroller unit via the reset controller.

15. The method of operating the microcontroller unit of claim 10 wherein the microcontroller unit comprises a part of a system-on-chip integrated circuit.

16. The method of operating the microcontroller unit of claim 11 comprising programmably providing the plurality of low voltage interrupt signals to a plurality of the number of respective logic elements of the microcontroller unit via the reset controller.

17. The method of operating the microcontroller unit of claim 12 comprising:
providing at least one of the plurality of low voltage interrupt signals to general purpose input-output ports of the microcontroller unit via the reset controller.

18. A microcontroller unit comprising:
a reset controller operably coupled to a plurality of logic elements of the microcontroller unit,
a low voltage detection logic is operably coupled to the reset controller, the low voltage detection logic arranged to provide a plurality of low voltage interrupt signals to a number of respective logic elements of the microcontroller unit via the reset controller, wherein the plurality of low voltage interrupt signals comprises at least two of:
a warning that a voltage supply to the microcontroller unit is to traverse out of specification;
a notification that a voltage supply to the microcontroller unit has traversed out of specification; and
a reset initiating signal; and
at least one register operably coupled to the low voltage detection logic, wherein the at least one register employs register locking to enable the at least one register to only be accessed once prior to reset upon receiving a low voltage interrupt signal of the plurality of low voltage interrupt signals at the at least one register.

* * * * *